No. 872,575. PATENTED DEC. 3, 1907.
J. W. NILSSON.
CULTIVATOR.
APPLICATION FILED APR. 11, 1907.
3 SHEETS—SHEET 1.
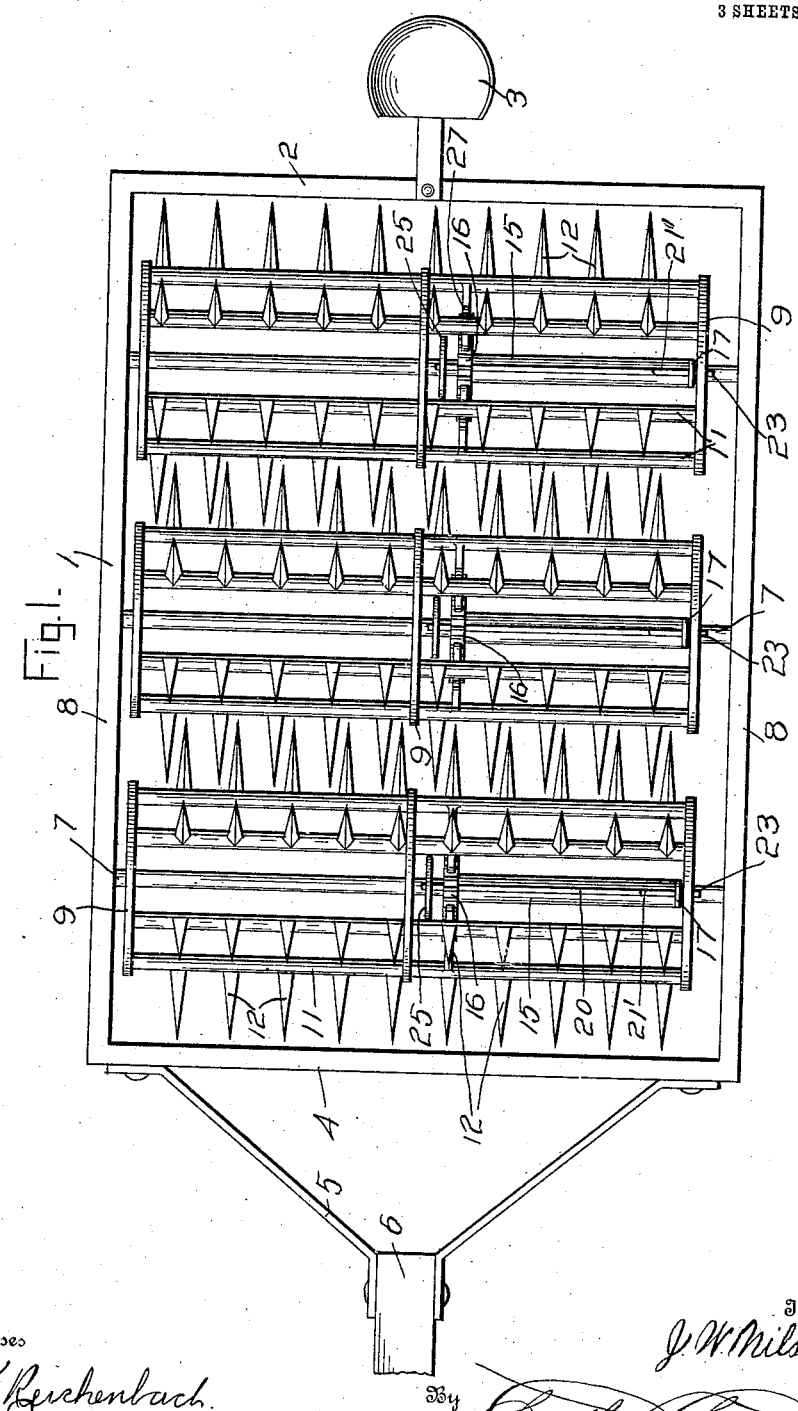

No. 872,575. PATENTED DEC. 3, 1907.
J. W. NILSSON.
CULTIVATOR.
APPLICATION FILED APR. 11, 1907.
3 SHEETS—SHEET 2.
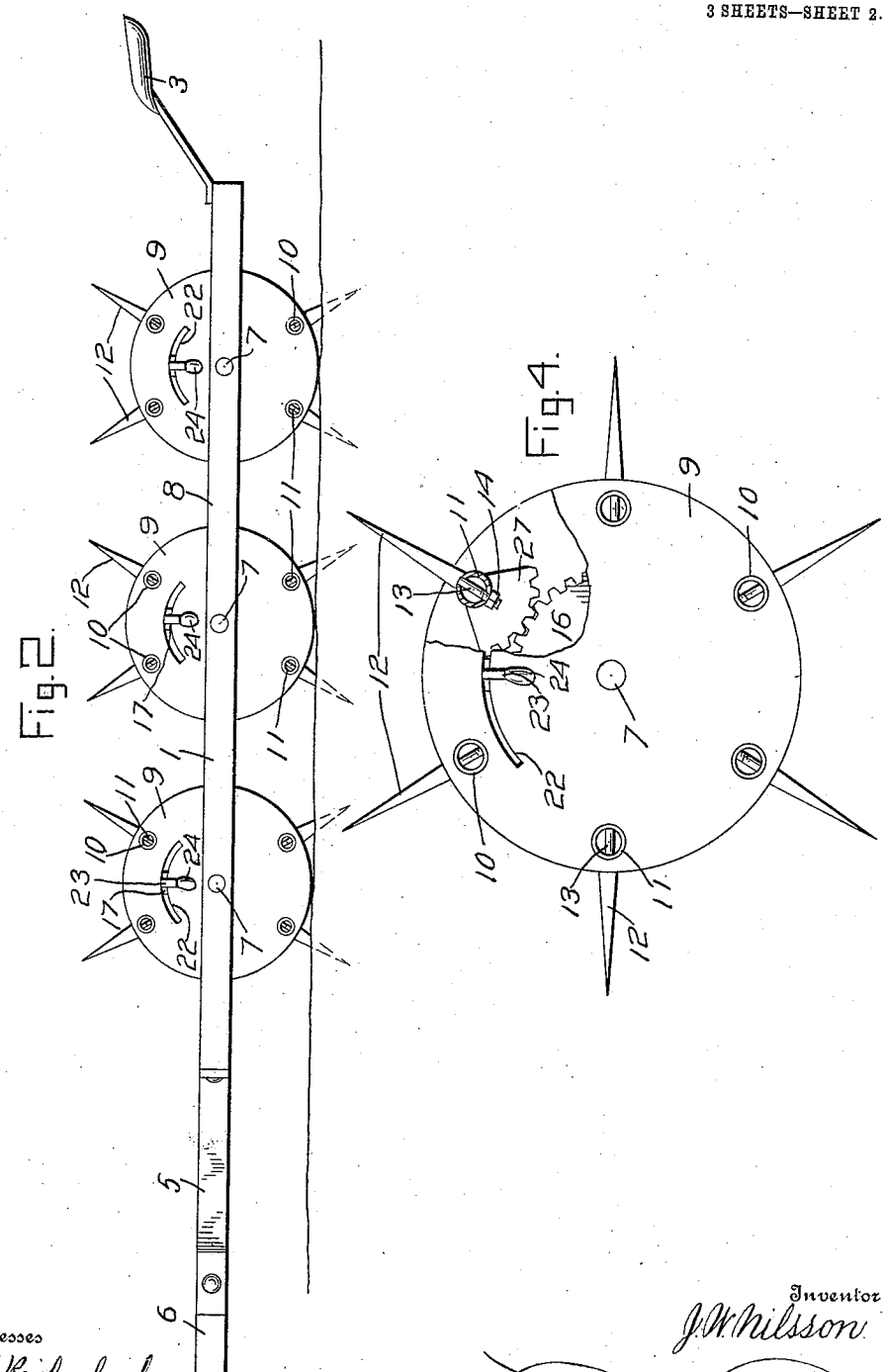

No. 872,575. PATENTED DEC. 3, 1907.
J. W. NILSSON.
CULTIVATOR.
APPLICATION FILED APR. 11, 1907.
3 SHEETS—SHEET 3.
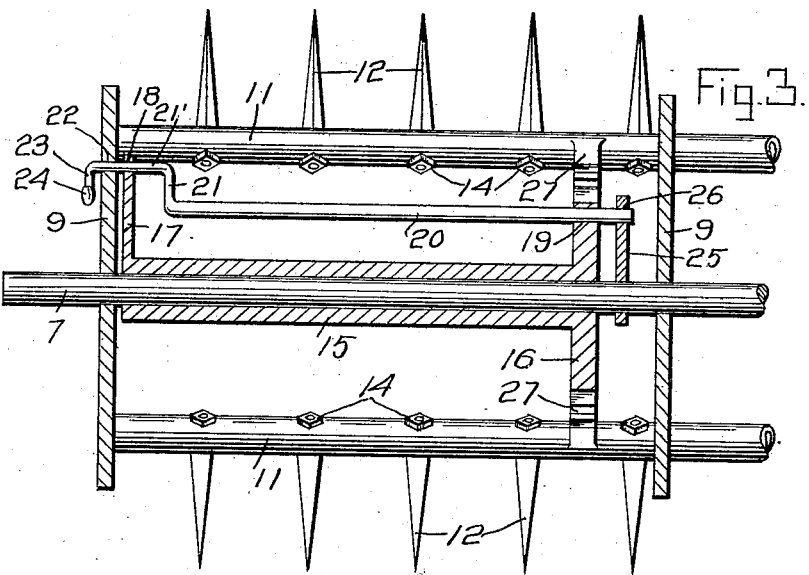
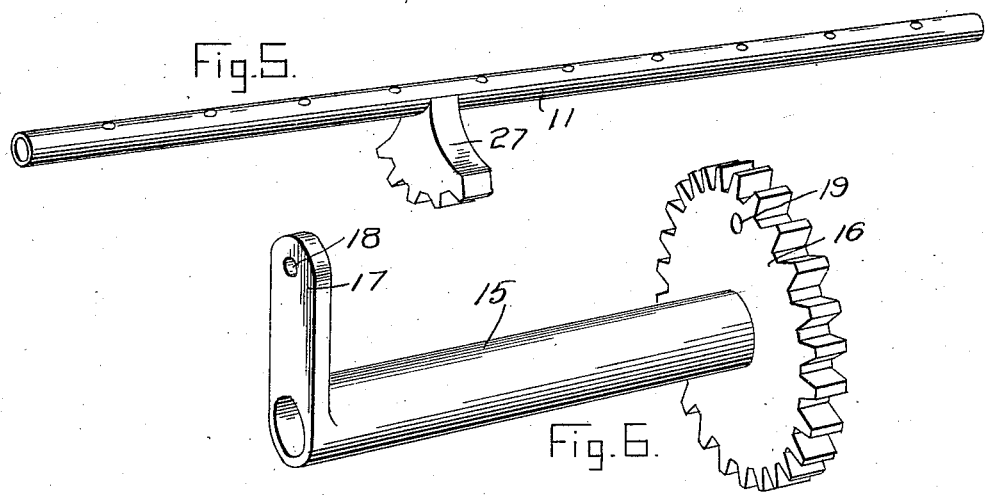
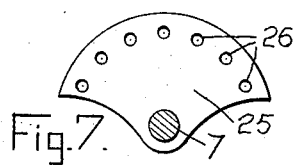
Witnesses
Inventor
J. W. Nilsson
By
Attorneys

UNITED STATES PATENT OFFICE.

JOHN W. NILSSON, OF BALFOUR, NORTH DAKOTA.

CULTIVATOR.

No. 872,575.　　　Specification of Letters Patent.　　　Patented Dec. 3, 1907.

Application filed April 11, 1907. Serial No. 367,585.

*To all whom it may concern:*

Be it known that I, JOHN W. NILSSON, a citizen of the United States, residing at Balfour, in the county of McHenry, State of North Dakota, have invented certain new and useful Improvements in Cultivators; and I do hereby declare the following to be a full, clear, and exact description of the invention, such as will enable others skilled in the art to which it appertains to make and use the same.

This invention relates to new and useful improvements in cultivators and it has particular reference to a cultivator embodying ground rollers provided with teeth for crushing clods and for mixing the previously distributed fertilizing material into the newly broken ground.

In connection with a cultivator of the above type, the invention aims as a primary object to provide novel features of construction constituted of a rocking mount for the teeth and means for adjusting said teeth to selected positions, and for fixing them in any position to which they may be adjusted.

The invention aims as a further object to provide a cultivator embodying a novel construction, combination and arrangement of parts, the details of which will appear in the course of the following description, in which reference is had to the accompanying drawings forming a part of this specification, like characters of reference designating similar parts throughout the several views, wherein:—

Figure 1 is a top plan view of a cultivator constructed in accordance with the present invention. Fig. 2 is a side elevation thereof. Fig. 3 is a detailed elevation to show the construction of the ground rollers and the parts associated therewith, parts being shown in section and parts being broken away to allow of the clearer illustration of certain features of the invention. Fig. 4 is an elevation looking at one end of one of the ground rollers. Fig. 5 is a detail perspective view of a rocking shaft upon which the teeth above referred to are carried. Fig. 6 is a detail perspective view of a casting including means for adjusting said shaft to selected positions. Fig. 7 is a detailed side elevation of a casting having an arc-shaped row of openings and forming an element of an adjusting mechanism to be hereinafter described.

Referring to the accompanying drawings, the numeral 1 designates a supporting frame of suitable construction and of rectangular outline, which from its rear bar 2 supports the driver's seat 3, and from its front bar 4 carries forwardly projecting converging tongue braces 5, a tongue 6 being suitably supported, preferably by a pivot joint between the front end of said tongue braces. Shafts 7 have their ends journaled in the side bars 8 of the frame 1. The shafts 7 are arranged in transverse parallelism at equidistant intervals. Each of said shafts 7 is provided with disk-shaped plates 9 fixed thereto, and in the preferred embodiment of the invention, arranged adjacent the ends of said shafts and centrally thereof. The plates 9 are provided adjacent their perimeters with an annular series of openings 10, which are spaced apart at determinate intervals, and which register with the corresponding openings in the confronting plates 9. Rock shafts 11 are projected through the openings 10, and are of course arranged in annular series, corresponding to the arrangement of said openings. In the preferred embodiment of the invention, the shafts 11 are of tubular metal, and the cultivator teeth 12 have their shanks 13 projected through the shafts 11 at right angles to the axes thereof, lock nuts 14 or other fastening means being relied upon to fix the teeth 12. The latter are of any conventional form and are preferably flat sided and of triangular cross sectional contour.

A casting 15 is mounted upon each of the shafts 7 adjacent one end thereof. The casting 15 is illustrated in detail in Fig. 6 and comprises a sleeve loosely surrounding said shaft and provided at its inner end with a pinion 16, preferably cast integral with said sleeve, and at its outer end with a radially extending arm 17, having an opening 18 therein. The pinion 16 is likewise formed with an opening 19 and a rod 20 has its inner end projected through the opening 19 and beyond the pinion 16 and its outer end offset as at 21 and then bent at right angles to its offset as at 21' and projected through the opening 18 and through an arcuate slot 22 in the adjacent end plate 9. The portion of the rod 20 projecting beyond said end plate 9 is designated by the numeral 23 and if desired, may be formed with an angular handle 24. Each casting 15 is designed for rotatory movement with relation to its shaft 7, such movement being effected by manually moving the rod 20, using the handle 24 or projecting portion 23 as a grip. The rod 20 is capable of a restricted sliding movement in the openings 18 and 19, and in accordance with the direction of its movement is designed to be engaged with or disengaged from a fastening device therefor. The function of this fastening device is to hold the sleeve 15 and pinion 16 and the parts engaged therewith in any position to which they may be moved, and with this object in view, each fastening device is constituted of an arc-shaped member 25 fixed to each of the shafts 7 and provided with a plurality of openings 26, arranged in arcuate series. The inner projecting end of the rod 20 is designed to be engaged in a selected one of said openings in accordance with the adjustment desired. Pinion sectors 27 are fixed on each of the shafts 11 and are constantly in mesh with the pinions 16 respectively adjacent thereto. Consequently rotation of any one of the pinions 16 through the connections and in the manner described imparts simultaneous movement to the sectors 27 in mesh with said pinion. Such movement simultaneously rocks the shafts 11 in the same direction and with equal amplitude, to set the teeth 12 at selected angular dispositions with relation to the radii of the shaft 7 which is of course centrally located with respect to the surrounding shafts 11. Thus the pitch of the teeth 12 may be adjusted to any degree or reversed when desired. When the determined adjustment has been made in each ground roller, the rods 20 are moved inwardly to engage their ends in the proper opening 26, the inward movement of said rods being limited by the central plate 9.

In practical use, the teeth 12 are normally disposed so as to coincide with the radii of the shafts 7, but they may be adjusted at selected angles for different kinds of work. When the cultivator is traveling back over the ground upon which it has acted, the teeth 12 are positioned so as to drag instead of project as in the former instance.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. A machine of the type set forth comprising a frame, parallel shafts journaled therein, plates fixed in spaced parallel relation upon said respective shafts, rock shafts journaled in said plates and parallel to said first named shafts, teeth carried upon said rock shafts, means for simultaneously moving said rock shafts and the teeth carried thereby to selected positions, and means for fixing said rock shafts at any position to which they may be moved.

2. A machine of the type set forth comprising a frame, parallel shafts journaled therein, plates fixed in spaced parallel relation upon said respective shafts, rock shafts journaled in said plates and parallel to said first named shafts, teeth carried by said rock shafts, pinions loosely sleeved on said first named shafts, pinion sectors fixed on said rock shafts and meshing with said respective pinions, means for rotating said pinions, and means for holding said pinions at selected positions against rotation.

3. A machine of the type set forth comprising a frame, parallel shafts journaled therein, plates fixed in spaced parallel relation upon said respective shafts, rock shafts journaled in said plates and parallel to said first named shafts, teeth carried by said rock shafts, sleeves surrounding said first named shafts, pinions carried singly by each of said sleeves, radially extending arms carried singly by each of said sleeves, one of said plates at the end of each of said first named shafts being provided with an arcuate slot, rods slidably projected through the pinions and arms of each of said shafts, said rod having a portion thereof extending through said slot of the plate adjacent thereto, members fixed singly on each of said first named shafts adjacent said pinions, and having an arcuate series of openings therein, and pinion sectors fixed on said rock shaft and meshing with said respective pinions.

In testimony whereof, I affix my signature, in presence of two witnesses.

JOHN W. NILSSON.

Witnesses:
D. T. OWENS,
JENNIE ALEXSON.